Patented Apr. 28, 1942

2,281,076

UNITED STATES PATENT OFFICE 2,281,076

METHOD OF MAKING REFLECTING GLASS

Arthur D. Nash, Sewickley, Pa., assignor to Pittsburgh Plate Glass Company, Allegheny County, Pa., a corporation of Pennsylvania No Drawing. Application November 1, 1938, Serial No. 238,222

4 Claims. (Cl. 49—79)

The present invention relates to glass and more particularly to a special glass batch, from which a new glass having reflecting surfaces may be produced.

The primary object of this invention is the provision of a glass which is substantially transparent to visual rays and at the same time has a metallic or mirror-like surface resulting from the ingredients of the glass batch.

Other objects and advantages of the invention will become more readily apparent in the following detailed description of certain preferred embodiments thereof.

Although many chemical elements have been made a part of glass batches in the prior art, the use of silver compounds has never been successful due to the fact that reduction of the silver salts to metallic silver produces dark spots or flakes which detract from the appearance of the glass. I am aware, however, that silver chloride has been used in a glass batch to produce an opaque or "opal" glass and also that metallic silver has been used in the batch in order that the material could be melted electrically. In each case, however, the resultant glass was not transparent and the deep color imparted thereto by the silver made the glass objectionable for many purposes. It is known that solutions of silver nitrate sprayed upon glass plates and then fired result in the formation thereon of a yellow stain which, although rather well burned into the glass, is in fact only a surface film.

I have discovered that small portions of silver nitrate may be added to a standard glass batch to yield a glass, the transparency of which is only slightly reduced and which will, upon subsequent firing in a reducing atmosphere, be given a metallic or mirror-like surface. Such glass could be produced at reasonable cost and will have many uses, as for example, in installations wherein a one-way vision glass is desired. It will be understood, of course, that the glass resulting from the disclosed treatment will not be as effective in restricting vision therethrough as a plate glass to which an exceedingly thin film of silver has been applied, but at the same time, the metallic surface of my glass will not be subject to deterioration normally present in the so-called one-way vision glass.

The composition of the batch may vary considerably both qualitatively and quantitatively according to the particular glass which is to be produced. For example, larger amounts of silver nitrate could be incorporated to produce a glass having a deeper amber color and a more pronounced mirrored surface. The following compositions have been found to be especially advantageous:

Table I

| | Parts |
|---|---|
| Sand | 1,000 |
| Sodium carbonate | 300 |
| Calcium carbonate | 300 |
| Sodium nitrate | 30 |
| Sodium chloride | 25 |
| Sodium sulfate | 5 |
| Aluminum oxide | 21 |
| Boric oxide | 30 |
| Arsenic oxide | 15 |
| Silver nitrate | 11¼ |
| Manganese oxide | 3¾ |

Table II

| | Parts |
|---|---|
| Sand | 950 |
| Sodium carbonate | 210 |
| Potassium carbonate | 140 |
| Feldspar | 160 |
| Calcium carbonate | 160 |
| Zinc oxide | 150 |
| Boric oxide | 60 |
| Silver nitrate | 12 |
| Sodium uranate | 4 |
| Arsenic oxide | 4 |
| Manganese oxide | 4 |

The glass batch is melted and fined in the customary manner, cast, rolled or drawn in sheet or plate form, and annealed. The resultant glass has a slight amber color, the intensity of which may be controlled by the percentage of silver salt added to the original glass batch. It has, however, been ascertained that from 0.5 of 1 per cent to 1 per cent of silver salt produces a glass which will react most favorably during subsequent treatment, and approximately 0.65 of 1 per cent of silver nitrate will yield optimum results.

After the sheets of glass have been produced, they are reheated in an oxygen deficient atmosphere or reducing atmosphere under which treatment a portion of the silver salts distributed throughout the glass is reduced to metallic silver. Obviously this reduction is limited to the surfaces of the sheets and the minute quantities of silver salt available for such surface reduction prevents the formation of an entirely translucent silver film and there is produced an opalescent metallic finish upon the glass. The reduction takes a comparatively short time and thereafter the glass is gradually returned to room temperature.

The secondary treatment of the glass may be accomplished during the annealing operation if desired, thus obviating the necessity of a separate operation entailing the use of additional equipment. The annealing leer may contain luminous flame heaters, directed against the glass surfaces in such manner that a suitable reduction takes place thereon or the leer may contain an oxygen deficient atmosphere.

The special character of the glass resulting from the foregoing process arises primarily from its silver content. Other elements in the glass batch are, however, of considerable importance. For example, the presence of boron influences favorably the secondary silver reduction and provides a greater surface brilliancy on reflected light together with less absorption of transmitted light.

It will be understood that in the present case direct vision through the treated glass is still possible and the product will transmit a large portion of the visible light rays. At the same time, because of the mirrored surface, a portion of the light will be reflected, especially when there is a differential of light intensities upon opposite sides of the sheet of glass.

It will at once be obvious that considerable variation in the batch is possible without departing from the spirit of the invention or the scope of the appended claims.

What I claim is:

1. In the production of reflecting sheet glass containing a relatively small percentage of a silver salt, the steps comprising melting a glass batch containing a silver salt, forming the molten glass into sheets, and subsequently subjecting these sheets to heat in a reducing atmosphere.

2. A process of producing reflecting glass which comprises adding silver nitrate to a glass batch, melting the batch, forming the molten material into sheets, and exposing the sheets to a reducing flame to produce thereon a mirror-like surface.

3. A process of producing reflecting glass, which comprises incorporating silver nitrate with a glass batch, melting the batch, shaping the molten material to a predetermined configuration and subsequently subjecting the shaped glass to heat in a reducing atmosphere.

4. A process of producing reflecting glass, which comprises melting a mixture of sand, soda ash, limestone, sodium nitrate, common salt, salt cake, hydrated aluminum oxide, boric oxide, arsenic trioxide, silver nitrate and manganese oxide, shaping the molten material to a predetermined shape, and subsequently subjecting the shaped glass to heat in a reducing atmosphere.

ARTHUR D. NASH.